US009205574B2

(12) United States Patent
Ferrand et al.

(10) Patent No.: US 9,205,574 B2
(45) Date of Patent: Dec. 8, 2015

(54) SELF-LOCKING MOLD FOR MOLDING AND VULCANIZING TIRES USING LEVERAGE

(71) Applicants: COMPAGNIE GENERALE DES ESTABLISSEMENTS MICHELIN, Clermont-Ferrand (FR); MICHELIN RECHERCHE ET TECHNIQUE, S.A., Granges-Paccot (CH)

(72) Inventors: Jean-Charles Ferrand, Clermont-Ferrand (FR); Jean-Claude Aperce, Clermont-Ferrand (FR); Adrien Mondolo, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/361,711

(22) PCT Filed: Nov. 28, 2012

(86) PCT No.: PCT/EP2012/073854
§ 371 (c)(1),
(2) Date: May 30, 2014

(87) PCT Pub. No.: WO2013/079541
PCT Pub. Date: Jun. 6, 2013

(65) Prior Publication Data
US 2015/0050376 A1 Feb. 19, 2015

(30) Foreign Application Priority Data

Nov. 30, 2011 (FR) ...................... 11 60962

(51) Int. Cl.
B29C 33/20 (2006.01)
B29D 30/06 (2006.01)
B29L 31/00 (2006.01)

(52) U.S. Cl.
CPC ............ *B29C 33/20* (2013.01); *B29D 30/0629* (2013.01); *B29L 2031/757* (2013.01)

(58) Field of Classification Search
CPC . B29D 30/0606; B29D 30/0629; B29C 33/20
See application file for complete search history.

(56) References Cited

U.S. PATENT DOCUMENTS

| 5,180,592 A | 1/1993 | Laurent |
| 5,304,270 A | 4/1994 | Siegenthaler |

(Continued)

FOREIGN PATENT DOCUMENTS

| EP | 0436495 | 7/1991 |
| EP | 1918087 | 5/2008 |
| FR | 2087540 A5 | 12/1971 |

OTHER PUBLICATIONS

International Search Report for PCT/EP2012/073854 dated Feb. 12, 2013.

*Primary Examiner* — James Mackey
(74) *Attorney, Agent, or Firm* — Dickinson Wright PLLC

(57) ABSTRACT

Segmented mold for molding and vulcanizing a tire of given diameter (DS), having a width (L) and a diameter (J) at the interconnect point (E), comprising shells and segments collaborating to withstand the internal pressure and remain in the closed position without assistance from additional components, in which mold each segment comprises at its lateral edges a projection extending radially inwards, which projection is equipped with a lip extending axially towards the inside of the mold and having an inclined frustoconical surface of given angle (α) with respect to the axis (XX') of the mold such that the extensions of the line of each frustoconical surface on a meridian plane intercept on the radially internal side of the segment concerned, and in which mold each shell comprises a projection extending radially outwards and provided with a lip having a frustoconical surface inclined by the same angle α with respect to the axis XX' of the mold. The distance (α) comprised between a straight line (tt') parallel to the axis of the mold and passing through the point (T) of application of the resultant of the forces (F) of contact between the shells and the segments, and a straight line (ss') parallel to the axis of the mold situated in the extension of the internal face of the resistant segment is equal to $$k * 0.42 * D_s \left(\frac{L}{J}\right)^2,$$

with a coefficient k comprised between 0.8 and 1.4.

9 Claims, 4 Drawing Sheets

(56) References Cited

U.S. PATENT DOCUMENTS

| | | | |
|---|---|---|---|
| 5,492,464 A * | 2/1996 | Irie | 425/46 |
| 5,589,200 A * | 12/1996 | Irie | 425/46 |
| 7,354,261 B1 * | 4/2008 | Hineno et al. | 425/46 |
| 7,862,317 B2 * | 1/2011 | Menard et al. | 425/47 |
| 2008/0178990 A1 | 7/2008 | Menard et al. | |

* cited by examiner

SELF-LOCKING MOLD FOR MOLDING AND VULCANIZING TIRES USING LEVERAGE

This application is a 371 national phase entry of PCT/EP2012/073854, filed 28 Nov. 2012, which claims priority of FR 1160962, filed 30 Nov. 2011, the contents of which are incorporated herein by reference for all purposes.

BACKGROUND

1. Field

The disclosure relates to the field of the manufacture of tires and more particularly to the vulcanizing of very wide tires using molds referred to as self-locking molds.

2. Description of Related Art

Traditional molds are made up of several separate components which, when brought relatively closer together, delimit a substantially toroidal molding space. They essentially comprise two shells for molding the side walls of the tire, and several peripheral segments, situated axially between the shells, for molding the tread. All of these components are brought closer together by a mechanism external to the mold.

The green tire for vulcanizing is introduced into the mold and a curing membrane presses the tire firmly against the mold so as to imprint the pattern of the tread and obtain a vulcanized tire of precise dimensions. The pressure applied by the tire to the mold components is reacted by mechanisms which transfer the forces to the chassis of the curing press in order to keep the mold closed throughout the curing time.

More specifically, the invention is concerned with molds referred to as self-locking molds which have the special feature of comprising shells and segments which collaborate to withstand the pressure so that the components of the mold remain in the closed position without the aid of additional external wedging or maintaining components.

Publication EP 0 436 495, or alternatively publication EP 1 918 087, describe a mold of this type in which each segment comprises at its lateral edges a projection extending radially towards the inside of the mold and equipped with a lip extending axially towards the inside of the mold. The radially outer end of each shell terminates in a complementary volume comprising a projection equipped with a lip. The said lips collaborate to keep the mold closed when this mold is subjected to an internal pressure that has a tendency to part the shells axially from one another and cause the sectors to retreat radially.

The mold comprises frustoconical bearing surfaces on the lips of the said segments and of the said shells. The said frustoconical surfaces are inclined by an angle $\alpha$ with respect to the axis of the mold, so that the extensions of the line of these frustoconical surfaces on a meridian plane passing through the axis of the mold intersect on the radially internal side of the segment concerned.

In order for the mold always to remain closed, the angle $\alpha$ is calculated so that the effect of the internal pressure on the shells which has a tendency to cause the segments to move closer towards the centre of the mold is dominant over the effect of the internal pressure on the segments that have a tendency to cause the segments to part radially and, by transmission of the radial forces via the frustoconical surfaces, to cause the shells to move axially closer together.

In this respect, the higher the internal pressure, the greater the forces holding the mold closed. This type of mold is therefore more commonly referred to as a self-locking mold.

The angle $\alpha$ is more or less determined by the ratio of the surface area of the shells subjected to the internal pressure and the surface area of the segments subjected to the said pressure.

It will be noted that this ratio corresponds to the ratio of the diameter J of the mold at the interconnect point and the width L of the mold between the upper interconnect point and the lower interconnect point.

The forces involved are relatively high and the components are dimensioned in order to allow the smallest possible clearance, and so this may result in a mold the components of which are massive and, as a consequence, more expensive.

SUMMARY

Thus, the wider the tread in relation to the side wall, the smaller the angle $\alpha$ needs to be, the consequence of this being a significant increase in the size of the projections intended to collaborate via the frustoconical surfaces. At the same time, the greater this width the greater the tendency of the backs of the segments is to bulge radially outwards under the effect of the internal pressure. And the greater will be the need to increase the radial thickness of the segments in order to combat these forces so as to avoid the appearance of circumferential clearances between the segments in the equatorial zone.

It is an object of embodiments of the invention to propose design rules for the design of a self-locking type of mold as described hereinabove that make it possible greatly to reduce the quantity of material needed to keep the said mold in a closed position under the effect of the pressure while at the same time effectively combating clearances between the segments.

In order to do this, embodiments of the invention make use of the forces present at the points of contact between the two frustoconical surfaces.

In a meridian plane passing through the axis of the mold, if one considers the straight line parallel to the axis of the mold and passing through the point of application of the resultant of the forces of contact between the shells and the segments, which can be likened in the case of the mold described hereinabove to the point of contact between the two frustoconical surfaces, and a straight line also parallel to the axis of the mold and situated in the extension of the internal part of the segment, and as a is the (radial) distance between the two straight lines, it is found that the resultant of the forces at this point of contact, applied with a lever arm equal to a, generate at the segment a couple $C_F$ of opposite direction to the couple $C_P$ generated on the segment by the pressure forces applied to the wall of said segment. It is found that these couples are of opposite signs. The resultant couple $C_F+C_P=C$ is considered to be positive when this couple has the effect of causing the segments to bulge radially outwards at the origin of the circumferential clearance.

It is also found that the value of these forces and of these couples are dependent only on the value of the pressure and on the geometric characteristics of the mold and therefore of the tire intended to be introduced into the said mold.

It is has been demonstrated that, by carefully adjusting the value of the lever arm, and therefore of a, as a function of the diameter $D_S$ corresponding to the diameter of the tire and of the values L and J described hereinabove, the resultant couple C equal to $C_F+C_P$ can be made to be approximately equal to zero. This objective is achieved when:

$$a = 0.42 * D_S \left(\frac{L}{J}\right)^2$$

The invention therefore consists, in embodiments, in adjusting the length of the lever arm a by multiplying the value at equilibrium and determined by the result given hereinabove, by a coefficient k, preferably comprised between 0.8 and 1.4, depending on the dominant effect being sought.

Specifically, by altering the value of this lever arm it is even possible to make the resultant couple slightly negative so that the radial deformation of the segments under the effect of the pressure is directed radially towards the inside of the mold.

The latter effect is obtained for values of k preferably comprised between 1 and 1.4 and proves particularly advantageous in that it allows circumferential bracing between segments, and makes it possible to obtain perfect contact between the segments at the centre of the tread without there being any need for a disproportionate increase in the radial thickness of the resistant segments.

Conversely, in order to reduce the masses of the components that form the segments, it is possible to make do with a lever arm that is shorter than the lever arm at equilibrium, by adjusting the said lever arm in order to have a circumferential clearance between the segments that is just below the permitted tolerances.

Advantageously, the angle of the frustoconical surface ($\alpha$) of the projections is comprised between 10° and 40° and preferably between 15° and 35°.

In order to reduce the wedge effect generated by the closure forces at the frustoconical surfaces, the mold may beneficially comprise force-limiting means made up of a stop and of a housing positioned respectively in the radial extension of each of the projections and each having a bearing surface, the said bearing surfaces being intended to come into contact with one another when the internal pressure in the mold exceeds a given threshold.

According to a first alternative, the stop and the housing are positioned on the radially external side of the projections of the shell and of the segments so that the axially external bearing surface of the stop collaborates with the axially external bearing surface of the housing.

According to a second alternative, the stop and the housing are positioned on the radially internal side of the projections of the shell and of the segments so that the axially internal bearing surface of the stop collaborates with the axially internal bearing surface of the housing.

Advantageously, the axial clearance between the bearing surface of the stop and the bearing surface of the housing, when the faces of each of the projections come into contact with one another, is comprised between 0.05 mm and 1 mm.

It is also possible to calculate the axial clearance between the bearing surfaces of the stop and of the housing when the faces of each of the projections come into contact with one another so that the bearing surfaces of the stop and of the housing come into contact when the pressure in the mold represents 50% to 80% of the nominal pressure.

BRIEF DESCRIPTION OF DRAWINGS

The description which follows is supported by FIGS. 1 to 4 in which.

DETAILED DESCRIPTION OF SPECIFIC EMBODIMENTS

Figure 1:
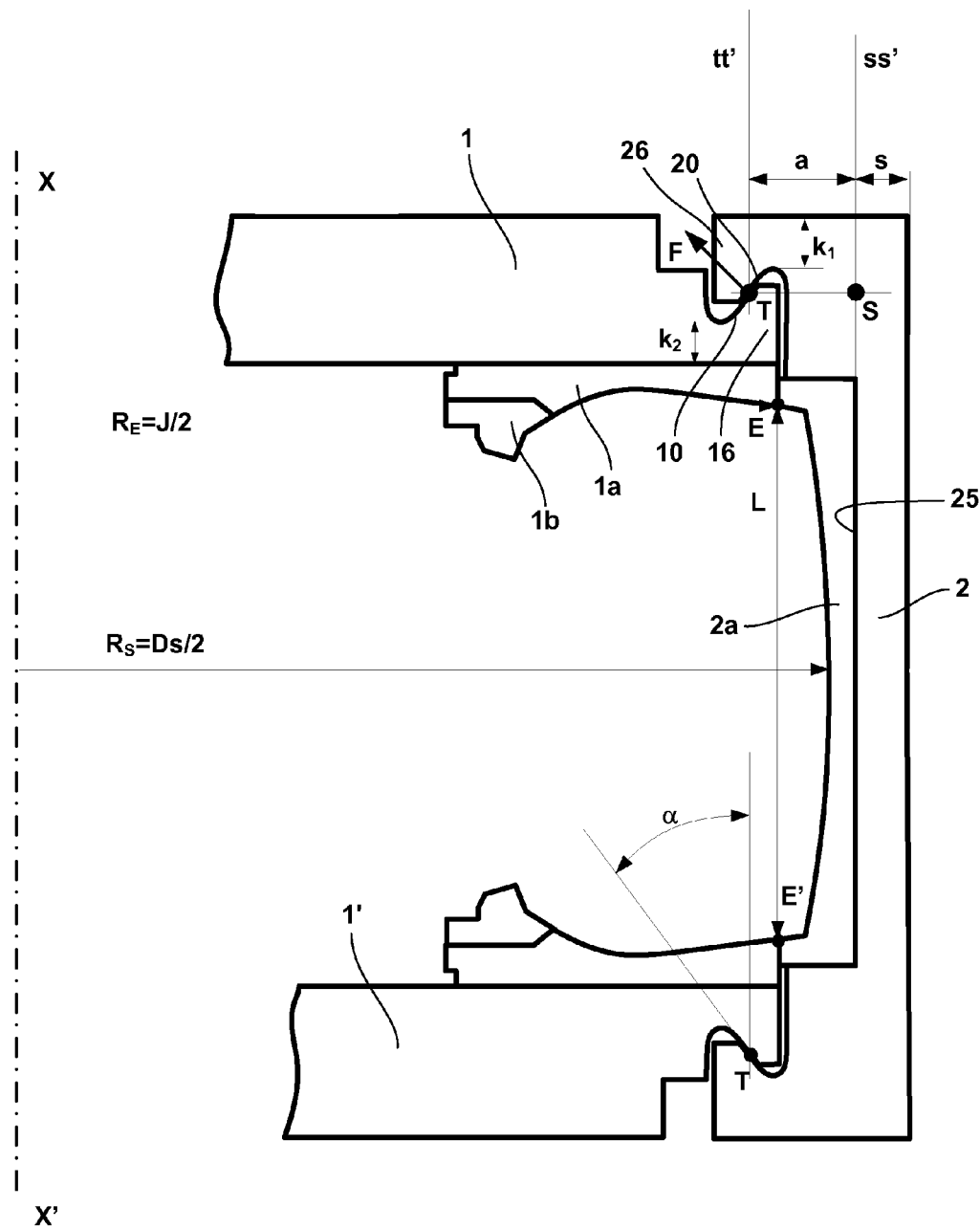
FIG. 1 is a half view in section on a meridian plane of a mold according to the invention.

FIG. 1 depicts a half view in section on a meridian plane of a mold according to the invention. The mold comprises an upper shell 1 and a lower shell 1' both of circular shape. Resistant segments 2 are circumferentially distributed around the shells 1 and 1'.

The shells and the segments are associated with opening and closing means (not depicted) which are able to move the shells in the axial direction and to move the segments in the radial direction. The mold of FIG. 1 is therefore depicted in the closed position corresponding to the position in which the internal pressure forces act on the shells and the segments.

Figure 2:
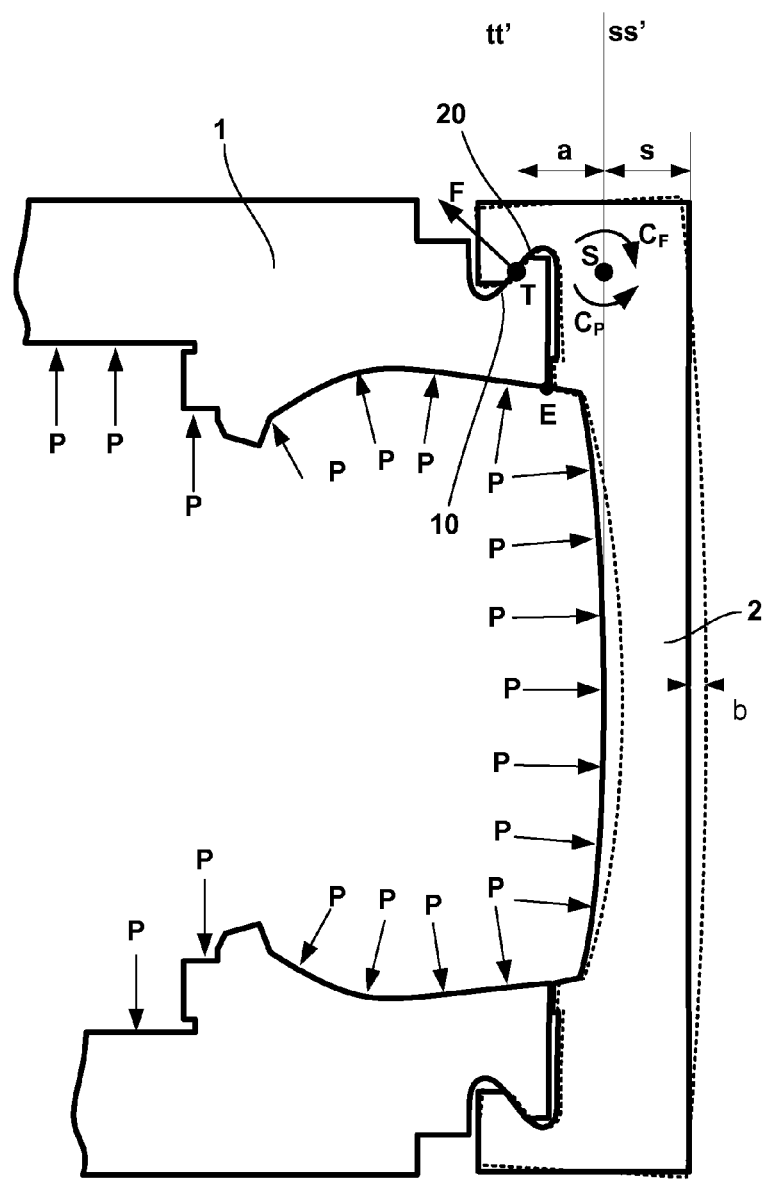
FIG. 2, illustrates the effects of the pressure forces on the mold.

As illustrated in FIG. 1, the shells may be formed of a resistant part 1 supporting nonresistant components 1a and 1b of which the radially internal part is intended to come into contact with the tire in order to mold the side wall zone (1a) or bottom part (1b). The term nonresistant here means components which contribute little if anything to the mechanical strength of the mold under the effect of the pressure forces. It goes without saying that the molding parts 1a and 1b may be produced as one with the shell 1 as illustrated in FIG. 2, or separately as illustrated in FIG. 1, in order to allow a certain degree of dimensional adaptation of the mold.

In the same way, the segments comprise a resistant part 2, and tread pattern elements 2a which are intended to mold the tread of the tire. The component 2a may also be formed as one with the resistant part 2, as illustrated in FIG. 2, and form therewith a single resistant component.

Each segment 2 comprises at its upper and lower lateral edge a projection 16 extending radially towards the inside and equipped with a lip likewise extending axially towards the inside of the mold and having a frustoconical surface 20. The frustoconical surface 20 makes an angle $\alpha$ with the axial direction of the mold. The extensions of the line of each frustoconical surface in the meridian plane intersect on the radially internal side of the mold. In the closed position, as illustrated in FIG. 1, the extensions of the frustoconical surfaces form a cone, the vertex of which is borne by the axis XX'.

Each shell comprises a projection 16 extending radially outwards and equipped with a lip having a frustoconical surface inclined by the same angle $\alpha$ with respect to the axis XX' of the mold.

In the closed position, the frustoconical surfaces 20 and 10 are positioned facing one another and are in contact with one another at a circular line intersecting the meridian plane at the point T. The point T is situated substantially in the middle of the height of the parts of frustoconical surface in contact with one another.

First of all, as has already been explained briefly, the angle $\alpha$ is determined so that the forces exerted by the shells on the conical surfaces have a tendency to close the mold by opposing the forces exerted by the segments. To a first approximation, it is comprised for Tg$\alpha$ to remain smaller than the ratio $$\frac{J}{2L}.$$

The values of the angle $\alpha$ are, as a general rule, comprised between 10° and 40° and preferably between 15° and 35°.

It will be noted here that too closed an angle does not allow compensation for the clearances between the segments and the shells and generates greater stresses in the hinges formed by the projections, and so, in practice, an angle α slightly below the limit imposed hereinabove will be defined.

The interconnect point E is defined as the point of contact, at the molding part, between the shell and the segment and marks the boundary between the zone in which the pressure forces acting on the shell are exerted and the zone in which the pressure forces acting on the segments are exerted.

The axial distance between the upper and lower interconnect points is denoted L. The radius at the interconnect point $R_E$ corresponds to half the diameter J. The radius $R_S$ corresponds to half the diameter $D_S$ of the mold at the equator.

A person skilled in the art tasked with designing the mold will secondly turn his attention to bear on the dimension of the components intended to react the loads introduced through the pressure forces, and on calculating the radial thickness s of the resistant segments.

With reference to FIG. 2, it may be seen that the pressure forces exert a thrust directed radially towards the outside of the mold. Under the effect of this thrust, the segments deform with a bulging b. The deformation has the effect of increasing the circumference of the mold in the equatorial plane and, as a consequence, of causing circumferential clearances to appear between the segments. Knowing the allowable clearance tolerance that avoids the rubber forming flash, it is then easy to determine the thickness s of the resistant segment in order to limit the deflection b to an admissible value.

However, as is mentioned in the introduction to the present description, it is found that this calculation may lead to very high thicknesses s and therefore to high mold production costs. It is this problem that the invention seeks to reduce.

The point T is defined as the point of application of the resultant of the forces F exerted between the shell and the segments. The straight line tt' passing through the point T and parallel to the axis XX' is plotted in the meridian plane passing through the axis XX'.

Likewise, and again in the said meridian plane, a straight line ss' is plotted which extends the line 25 of the intersection of the radially internal part of the resistant segment 2 with the said meridian plane.

When the molding part 2a coincides with the resistant segment 2, the straight line ss' is then likened to the straight line parallel to the axis XX' tangential to the top of the mold, and corresponding more or less to the straight line passing through the point of intersection of the mold with an equatorial plane perpendicular to the axis XX', as illustrated in FIG. 2. The intersection of the straight line ss' with a straight line perpendicular to the axis XX' and passing through the point T occurs at the point S. The distance a corresponds to the distance between straight lines tt' and ss'.

Still with reference to FIG. 2, the couple $C_F$ exerted by the resultant F of the closure forces at the point T with the lever arm a, and the couple $C_P$ corresponding to the couple exerted by the pressure forces on the resistant segment are then determined at the point S.

As has already been indicated, these two couples oppose one another and are directly proportional to the pressure P and dependent on the geometric characteristics of the mold represented by the values of DS, J and L. The couples $C_P$ and $C_F$ are independent of the value of the angle α.

In order for the two couples to balance one another approximately, i.e. for the bulging b of the back of the segments to be substantially equal to zero, a value of a is determined such that $$a = 0.42 * D_s \left(\frac{L}{J}\right)^2.$$

In order to transmit this couple via the projections 16 and 26 without excessive deformation of the components, the thicknesses $k_1$ and $k_2$ corresponding to the minimum thicknesses in line with the frustoconical surfaces then need to be determined. As a general rule, this usually results in a $k_1$ value close to the value of $k_2$.

In order to reduce the thicknesses it will be beneficial to reduce the value of the lever arm a in order to obtain a bulging b at the equatorial plane, the value of which gives a circumferential spacing of the segments equal to the maximum tolerance corresponding to flash appearing between the segments. In that case, a value of a corresponding to 0.9 times or even 0.8 times the value of a at equilibrium will be adopted.

Another approach is, on the other hand, to increase the value of a with respect to the value at equilibrium so as to obtain a "negative" bulge which in fact amounts to increasing the circumferential bracing of the segments against one another so as to compensate for the absence of an external bracing hoop positioned on the back of the segments. In that case, a value of a higher than the value of a at equilibrium will chosen, i.e. a value 1.3 or even 1.4 times that value. In fact the values of $k_1$ and $k_2$ are increased without thereby penalizing the overall mass of the mold excessively.

Another option for reducing the thicknesses of $k_1$ and $k_2$ is to equip the mold with a means that makes it possible to limit the forces exerted on the frustoconical walls pressed against one another under the effect of the pressure forces.

Figure 3:
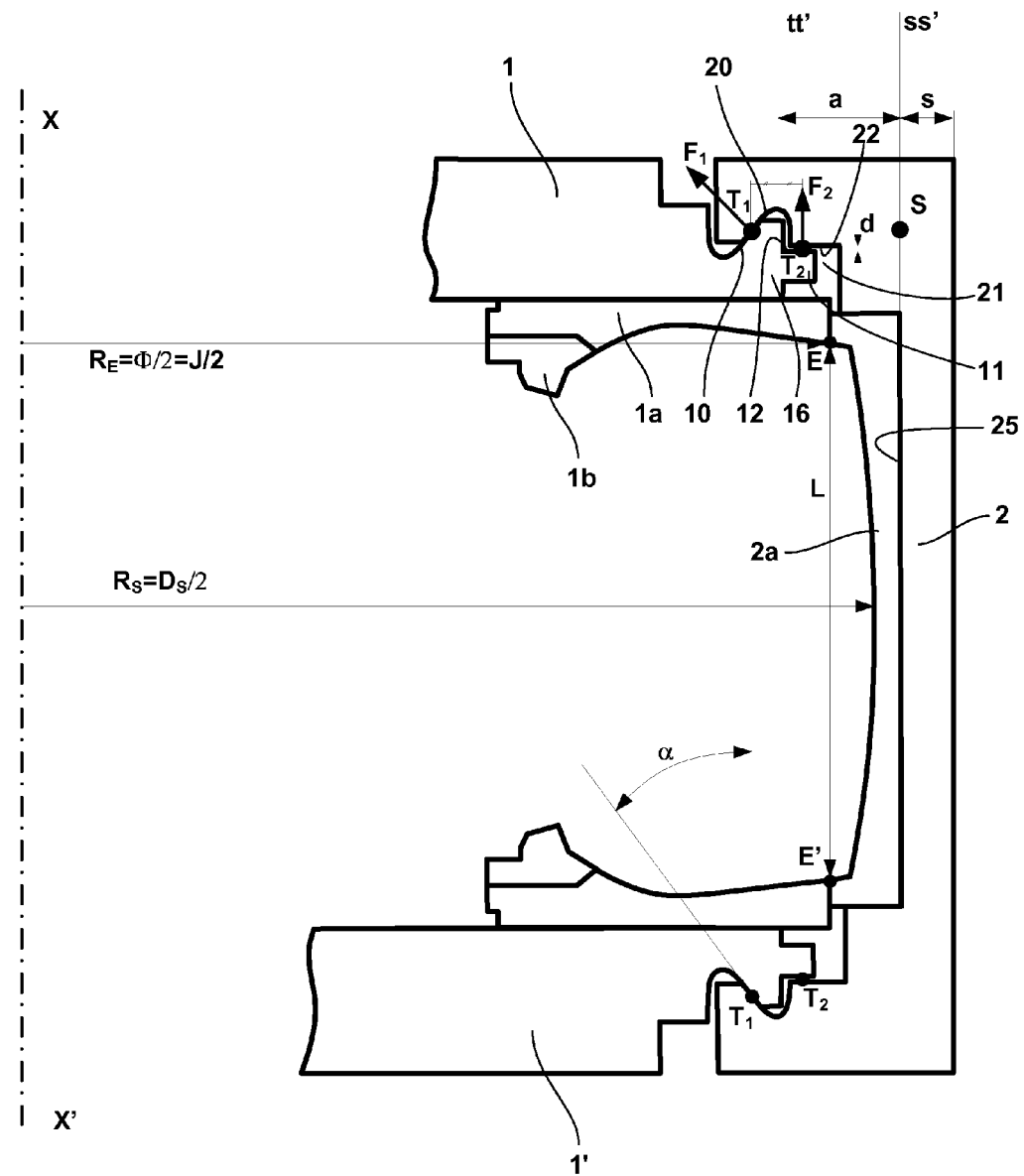
FIG. 3 illustrates an alternative embodiment of the mold that makes it possible to limit the forces at the points of contact between the frustoconical surfaces.
Figure 4:
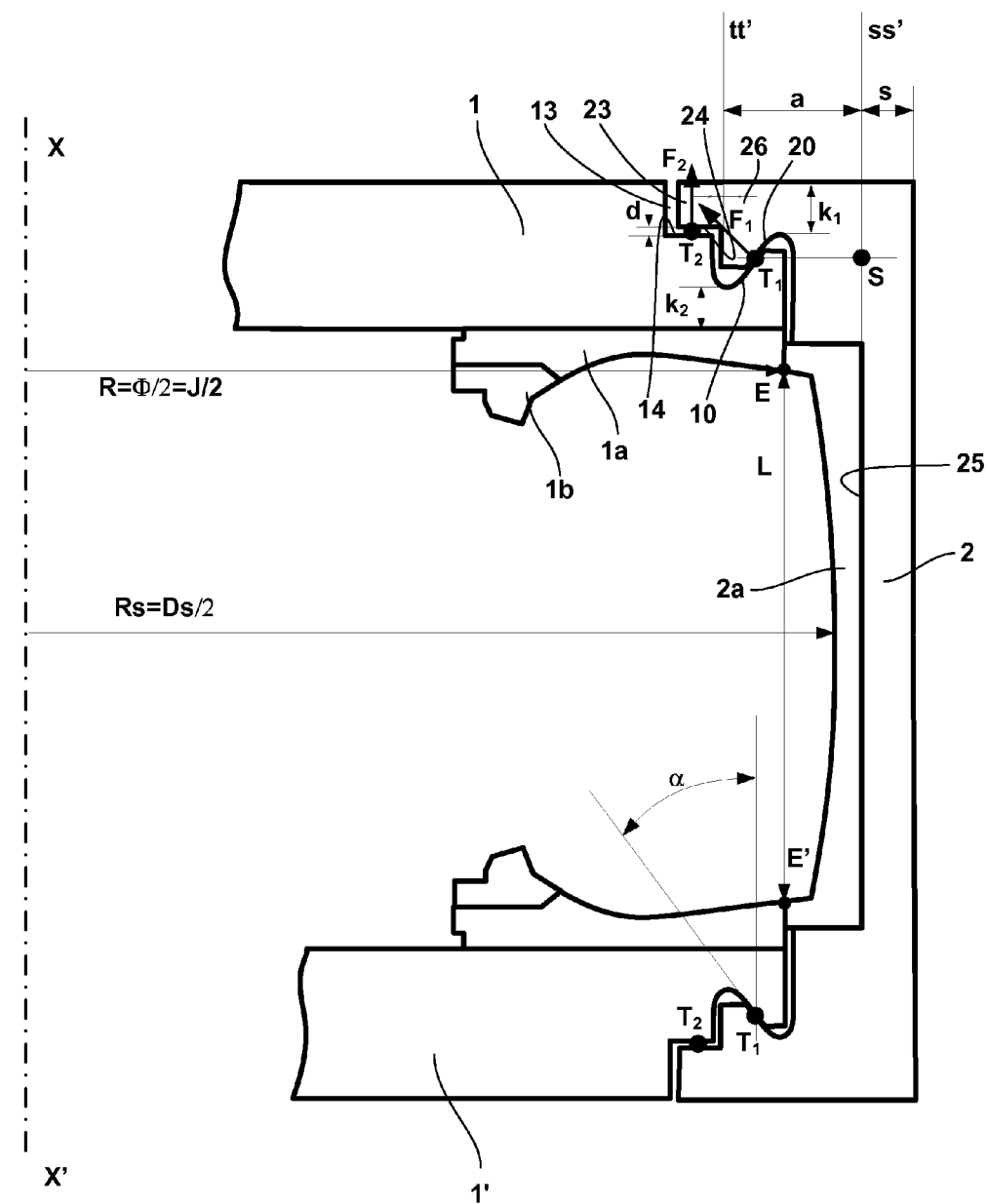
FIG. 4 illustrates an alternative form of embodiment of the alternative illustrated in FIG. 3.

Accordingly, the projection 16 of the shell 1 can be extended radially outwards by a stop 11 as illustrated in FIG. 3, or the projection 26 of the segments 2 can be extended radially inwards by a stop 23, as illustrated in FIG. 4.

The stop 11 collaborates with a housing 21 arranged on the segments 2, and the stop 23 collaborates with a housing 13 arranged on the shell 1.

Each stop and each housing has a bearing surface 12 and 22 (FIG. 3), or 14 and 24 (FIG. 4) respectively, which are intended to come into contact with one another when the pressure in the mold exceeds a given value.

When the pressure increases, the forces exerted by the shell have a tendency to cause the projection of the shell to penetrate the projection of the segments, increasing, as has already been seen, the clamping forces.

This clamping load translates, as has also been seen, into an increase in the value of the couples $C_F$ and $C_P$, which entails an increase in thicknesses $k_1$ and $k_2$ because of the wedging effect associated with the frustoconical nature of the contacting surfaces.

When the bearing surfaces of the stops come into contact with the bearing surfaces of the housings the wedge effect is limited and the transmission of forces is spread between the bearing surfaces of the stops and the frustoconical surfaces.

The clearance between the bearing surfaces 12 and 22 or between the bearing surfaces 14 and 24 is defined by the distance d between the bearing surfaces at the moment the frustoconical surfaces come into contact upon closure. This clearance may then officially be comprised between 0.05 mm and 1 mm depending on the size of the mold.

It is also possible to calculate the clearance so that the bearing surfaces of the stop and of the housing come into contact when the pressure in the mold reaches a predetermined pressure value. In practice, this clearance is calculated so that the bearing surfaces come into contact when the pressure reaches a value preferably comprised between 50% and 80% of the nominal pressure.

The point T of application of the closure forces is then situated radially between the point of contact of the frustoconical surfaces $T_1$ and the point of contact $T_2$ of the bearing surfaces 12, 24 of the stops or respectively 11 and 23, and of the bearing surfaces 22, 14 of the housings or respectively 21 and 13, as illustrated in FIGS. 3 and 4.

The distance a is measured, in a meridian plane passing through the axis X', between the straight line tt' parallel to the axis XX' of the mold and passing through the point T. In practice, this straight line tt' coincides with the right bisector of the straight lines parallel to the axis XX' of the mold and passing respectively through the points $T_1$ and $T_2$, and the straight line ss' parallel to the axis XX' and positioned in the extension of the radially internal part of the resistant segment 2.

The calculation of the value of a at equilibrium remains the same, and just as before, the value of the lever arm can be adjusted above or below this value at equilibrium in order to obtain the effects already described.

The invention claimed is:

1. A segmented mold for molding and vulcanizing a tire of given diameter ($D_S$), having a width (L) and a diameter (J) at an interconnect point (E), comprising shells and segments collaborating to withstand internal pressure and remain in a closed position without assistance from additional components, wherein the interconnect point (E) is a point of contact between a shell and a segment, wherein each segment comprises at lateral edges thereof a projection extending radially inwards, which projection is equipped with a lip extending axially towards the inside of the mold and having an inclined frustoconical surface of given angle ($\alpha$) with respect to an axis (XX') of the mold such that extensions of a line of each frustoconical surface on a meridian plane intercept on a radially internal side of the segment, and wherein each shell comprises a projection extending radially outwards and provided with a lip having a frustoconical surface inclined by the same angle $\alpha$ with respect to the axis XX' of the mold, wherein in projection onto the meridian plane passing through the axis XX' of the mold, the distance (a) comprised between a straight line (tt') parallel to the axis of the mold and passing through a point (T) of application of a resultant of forces (F) of contact between the shells and the segments, and a straight line (ss') parallel to the axis of the mold situated in an extension of an internal face of a segment is equal to $$k*0.42*D_s\left(\frac{L}{J}\right)^2,$$

with a coefficient k between 0.8 and 1.4.

2. The mold according to claim I, wherein the coefficient k is between 1 and 1.4, so that the segments undergo circumferential bracing.

3. The mold according to claim 1, wherein the angle of the frustoconical surface ($\alpha$) of the projections with the axial direction (XX') is between 10° and 40°.

4. The mold according to claim 1, further comprising force-limiting means made up of a stop and of a housing positioned respectively in a radial extension of each of the projections and each having a bearing surface, the bearing surfaces being adapted to come into contact with one another when the internal pressure in the mold exceeds a given threshold.

5. The mold according to claim 4, wherein the stop and the housing are positioned on a radially external side of the projections of the shell and of the segments so that an axially external bearing surface of the stop collaborates with an axially external bearing surface of the housing.

6. The mold according to claim 4, wherein the stop and the housing are positioned on a radially internal side of the projections of the shell and of the segments so that an axially internal bearing surface of the stop collaborates with an axially internal bearing surface of the housing.

7. The mold according to claim 4, wherein an axial clearance (d) between the bearing surface of the stop and the bearing surface of the housing, when frustoconical surfaces of each of the projections come into contact with one another, is between 0.05 mm and 1 mm.

8. The mold according to claim 4, wherein an axial clearance (d) between the hearing surfaces of the stop and of the housing when frustoconical surfaces of each of the projections come into contact with one another is tailored so that the bearing surfaces of the stop and of the housing come into contact when the pressure in the mold represents between 50% and 80% of the nominal pressure.

9. The mold according to claim 3, wherein the angle of the frustoconical surface ($\alpha$) of the projections with the axial direction (XX') is between 15° and 35°.

* * * * *